No. 812,946. PATENTED FEB. 20, 1906.
W. H. MITCHELL.
CULTIVATOR ATTACHMENT.
APPLICATION FILED JUNE 5, 1905.
2 SHEETS—SHEET 2.
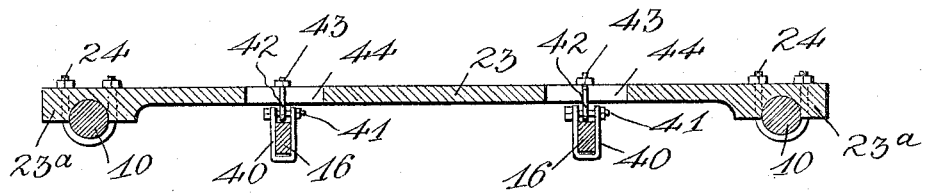
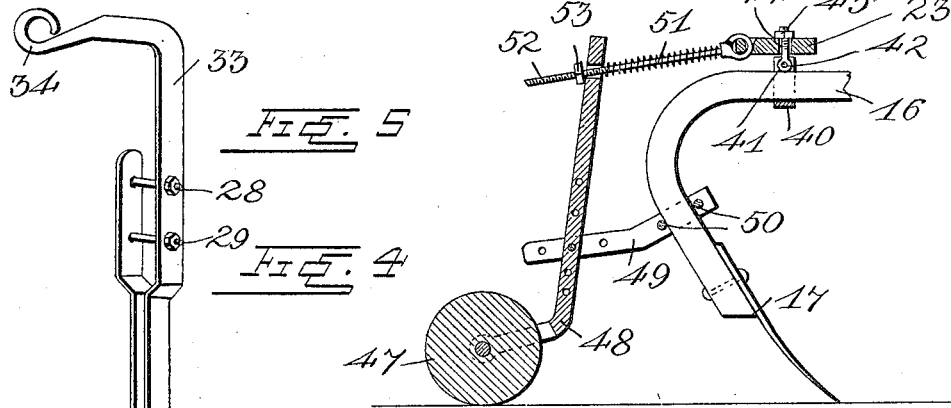
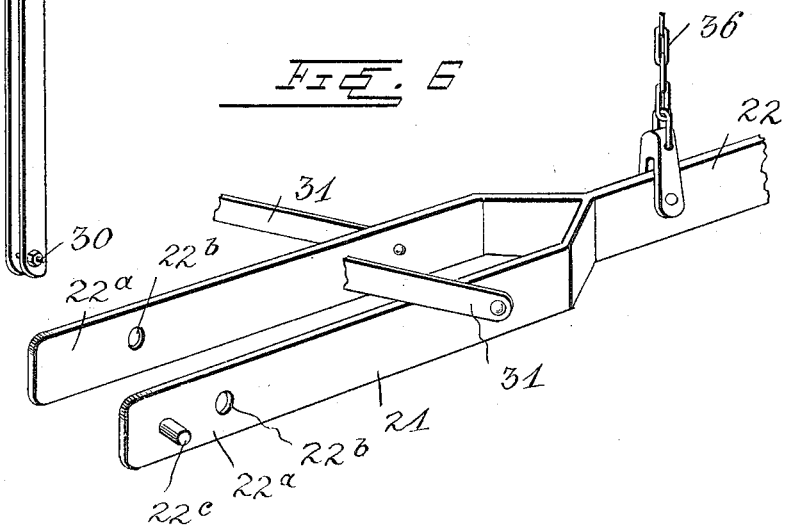
Witnesses
C. Munker
G. H. Griesbauer
Inventor
Wade. H. Mitchell
by H. B. Willson
Attorney

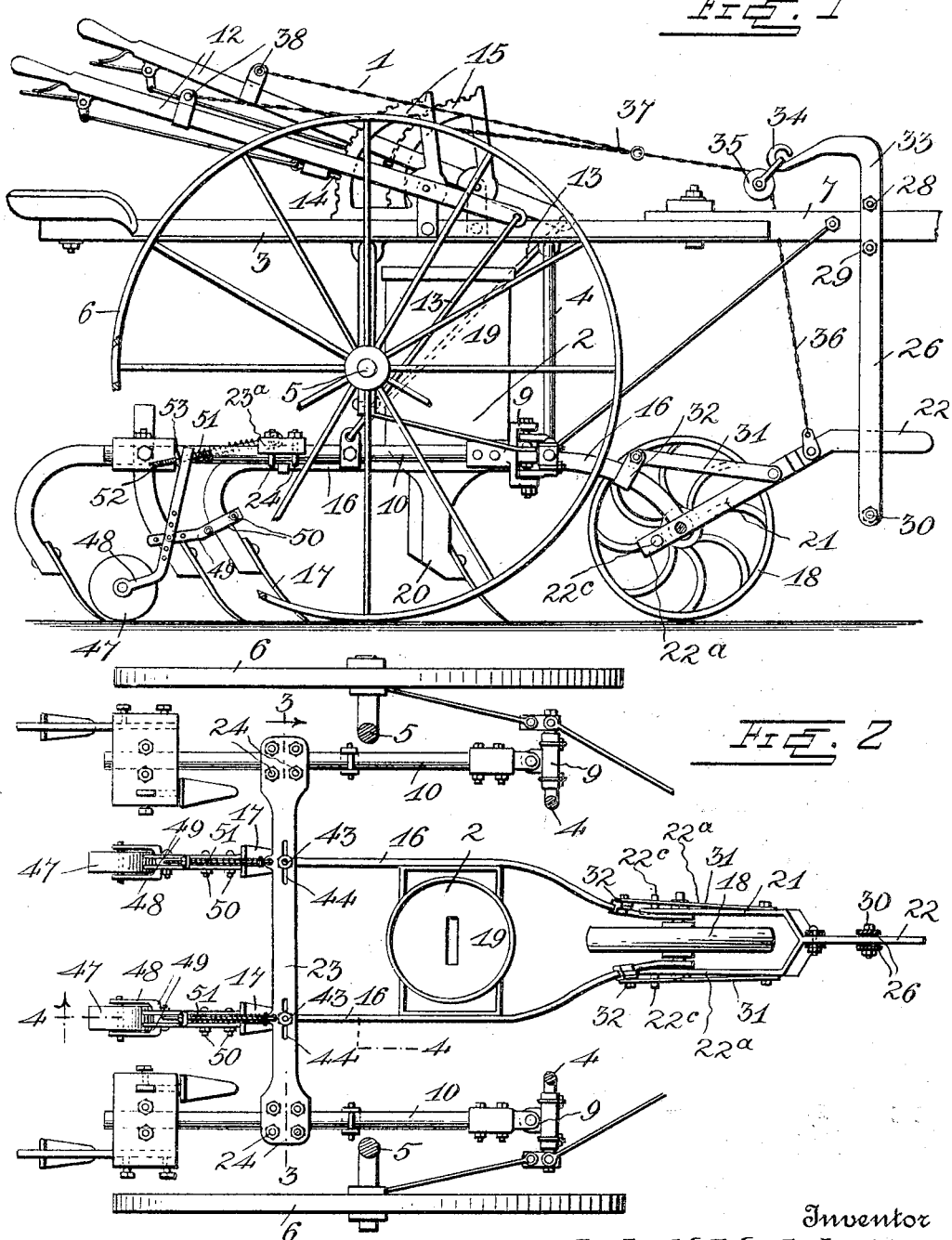

UNITED STATES PATENT OFFICE.

WADE H. MITCHELL, OF RUGBY, TEXAS.

CULTIVATOR ATTACHMENT.

No. 812,946.　　　Specification of Letters Patent.　　　Patented Feb. 20, 1906.

Application filed June 5, 1905. Serial No. 263,808.

*To all whom it may concern:*

Be it known that I, WADE H. MITCHELL, a citizen of the United States, residing at Rugby, in the county of Red River and State of Texas, have invented certain new and useful Improvements in Cultivator Attachments; and I do declare the following to be a full, clear, and exact description of the invention, such as will enable others skilled in the art to which it appertains to make and use the same.

My invention relates to improvements in planter attachments for cultivators, and more particularly to the one set forth in Patent No. 785,514, granted to me on March 21, 1905.

The object of the invention is to improve and simplify the construction of devices of this character, and thereby render the same more efficient and durable in use and less expensive to manufacture.

With the above and other objects in view the invention consists of certain novel features of construction, combination, and arrangement of parts, as will be hereinafter more fully described, and particularly pointed out in the appended claims.

In the accompanying drawings, Figure 1 is a side elevation of a riding-cultivator and a walking-planter secured together in accordance with my invention. Fig. 2 is a top plan view of the same with parts in section. Fig. 3 is a detail transverse sectional view taken on the line 3 3 of Fig. 2. Fig. 4 is a detail longitudinal sectional view taken on the line 4 4 of Fig. 2. Fig. 5 is a detail view of the guide for the front of the planter, and Fig. 6 is a detail view of the guide-arms carried by the cultivator-beam.

Referring to the drawings by numeral, 1 denotes a riding-cultivator of well-known construction, and 2 a well-known form of walking-planter, which is secured beneath and within said cultivator by my improved fastening means. The cultivator comprises a metal frame 3, having at its front end an arch 4 and at its rear end an arched axle 5, carrying supporting-wheels 6. The usual draft-tongue 7 is secured to the front end of the frame 3, and upon the lower ends of the arch 4 are secured, by universal couplings 9, the forward ends of longitudinal beams 10, which have cultivator-shovels at their rear ends. The swinging beams 10 are adapted to be raised and lowered by means of levers 12, which are pivoted intermediate their ends upon the frame 3 and which are connected by links 13 to said beams. The upper ends of the levers carry spring-actuated pawls 14, which coact with segmental rack-bars 15, secured upon the frame 3.

The planter 2 comprises a frame 16, which is supported at its rear end by shovels 17 and at its front ends by a steering and supporting wheel 18. Upon the upper side of the frame 16 is mounted the usual seed-hopper 19, beneath which is disposed the usual grain-discharge chute 20.

In connecting the planter to the cultivator I provide upon the forward end of the planter-frame 16 a yoke 21, having a forwardly-projecting tongue 22. The arms $22^a$ of the forked end of the yoke 21 are formed with apertures $22^b$ and with outwardly-projecting studs $22^c$. The apertures $22^b$ are provided to receive the ends of the axle of the guide-wheel 18 or to receive bolts which are passed through the forward ends of the side beams of the frame 16; but upon some forms of planters it is found desirable to connect the yokes thereto by having the studs $22^c$ project into openings formed in the frame 16. The provision of both the openings $22^b$ and the studs $22^c$ permits the yoke to be applied to a planter of any form and construction. The yoke 21 is held rigid with respect to the frame 16, but at the same time is permitted to be adjusted angularly in a vertical plane by providing one or more metallic straps 31, which have their forward ends secured to the yoke and their rear ends secured to clips or cuffs 32, which surround the beams 16 and are adjustably clamped thereon by bolts or the like. The tongue 22 is guided and held in alinement with the tongue 7 of the cultivator by a guide-arm 26, which depends from the latter and consists of two spaced bars connected at their lower ends by a bolt 30 and at their upper ends by bolts 28 29, which adjustably clamp them upon the tongue 7. The upper end 33 of one of said bars is curved or bent rearwardly and formed with a hook 34 to support a pulley or sheave-block 35. The latter is provided for the purpose of guiding a chain or other flexible connection 36, which has its lower end connected to the yoke 21 and its upper end forked, as shown at 37. The forked ends of this chain are adjustably secured to the levers 12 by clips or cuffs 38, which are passed around said levers and clamped thereon by means of screw-bolts or the like. The beams 16 of the planter 2 are secured to the beams 10 of the cultivator by a cross-bar 23, which is preferably in the form of a flat metal bar having enlarged ends, which are provided upon their under sides with sockets 23ª to engage the tops of the beams 10, which latter are preferably round. Two U-shaped clamping-bolts 24 are provided at each end of the cross-bar 23 for the purpose of clamping the beams 10 rigidly and securely at right angles to the cross-bar. The connection between the beams 16 and the cross-bar 23 is preferably effected by providing upon the former U-shaped clips or cuffs 40, through the upper ends of which are passed clamping-bolts 41. The latter also pass through eyes 42, formed upon the lower ends of bolts 43 and disposed between the arms of said clips or cuffs. The bolts 43 project through and are adjustable in longitudinally-disposed slots 44, formed in the cross-bar 23, so that the cross-bar will be adapted for use in connection with planters of different widths.

In planting corn, cotton, or other seed where it is desired to have the shovels 17 travel at a predetermined depth, so as to plant all the seed the same depth in the earth, I provide upon the rear of the beams 16 gage-wheels 47. These wheels are mounted in the lower ends of hangers 48, which have their upper portions adjustably pivoted between spaced bars 29 by means of screw-bolts which are passed through alining openings formed in said bars and through one opening of longitudinal series of openings formed in the hangers. These bars 49 are clamped, by means of bolts 50, upon the rear portions of the shovel-beams 16, and the hanger 48 is yieldably held in an adjusted position by a coil-spring 51, which surrounds a guide rod or bolt 52. The latter has one end connected to the cross-bar 23, and its opposite threaded end, which passes through an opening in the upper end of the hanger 48, carries an adjusting-nut 53. As will be seen upon reference to Fig. 4 of the drawings, when the nut 53 is adjusted the hanger 48, and hence its gage-wheel 47, may be yieldably held in any desired position, so as to limit the entrance of the shovel 17 in the ground.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a combined cultivator and planter, the combination of a guide-arm depending from the draft-tongue of the cultivator, said guide-arm consisting of two spaced bars, one of which has an extended angularly-bent portion formed with a hook, a planter-frame supported upon the cultivator-frame, a guide-bar having a forked end pivotally connected to the frame of said planter, and a forwardly-extending portion projecting between the spaced bars of the guide-arm and movable vertically therebetween, an adjustable clip upon the planter-frame, a link or strap connecting said clip and said guide-bar, a pulley upon said hook, and a flexible operating connection passed around said pulley and connected to said guide-bar for raising the planter-frame, substantially as described.

2. The combination with a cultivator having a draft-tongue, swinging shovel-beams and levers for operating the latter, and a planter having shovel-beams and a forwardly-projecting guide-bar, of means for connecting the beams of said cultivator and planter, a guide-arm depending from said tongue and consisting of spaced bars, one of which has an extended upper end formed with a hook, the guide upon said planter being adapted to project between said spaced bars, a pulley upon said hook, adjustable clips upon said levers, and a flexible operating connection passed around said pulley and having one of its ends attached to said guide-bar upon the planter and its other end forked and secured to said clips upon said levers, substantially as described.

3. The combination with a cultivator having shovel-beams, and a planter having shovel-beams, of a connecting cross-bar having at its end, socket portions to receive said cultivator shovel-beams, U-shaped bolts for clamping the latter in said socket portions, clips upon said planter shovel-beams, eye-bolts adjustably secured in longitudinal slots formed in said cross-bar, and bolts passed through said clips and the eyes of said eye-bolts, to connect the planter shovel-beams to said cross-bar, substantially as described.

4. The combination with a cultivator having shovel-beams, and a planter having shovel-beams, of a cross-bar connecting the beams of said planter and cultivator, spaced bars upon the beams of said planter, hangers adjustably pivoted between said spaced bars, gage-wheels upon the lower ends of said hangers, and adjustable spring connections between the upper ends of said hangers and said cross-bars for yieldably holding said hangers in an adjusted position, substantially as described.

In testimony whereof I have hereunto set my hand in presence of two subscribing witnesses.

WADE H. MITCHELL.

Witnesses:
B. L. McALISTER,
J. D. WILLIAMS.